United States Patent
Anderson et al.

[15] 3,651,923
[45] Mar. 28, 1972

[54] DISCRETE MATERIAL HANDLING APPARATUS

[72] Inventors: Charles M. Anderson, Paris; Harry G. Boling, Millersburg, both of Ky.

[73] Assignee: W. R. Corporation, Millersburg, Ky.

[22] Filed: Jan. 18, 1971

[21] Appl. No.: 107,314

[52] U.S. Cl..................................................198/168
[51] Int. Cl......................................................B65g 19/10
[58] Field of Search..........................................198/109, 168

[56] References Cited

FOREIGN PATENTS OR APPLICATIONS 516,960   1/1931   Germany..............................198/168

Primary Examiner—Edward A. Sroka
Attorney—William E. Sherwood

[57] ABSTRACT

Apparatus for handling large batch loadings of discrete material and for conveying the same to a discharge station embodies a conveyor having cooperating rigid and flexible flights simultaneously moving the material to the discharge station and while agitating the same.

8 Claims, 12 Drawing Figures

INVENTORS
CHARLES M. ANDERSON
HARRY G. BOLING

BY W. E. Sherwood
ATTORNEY

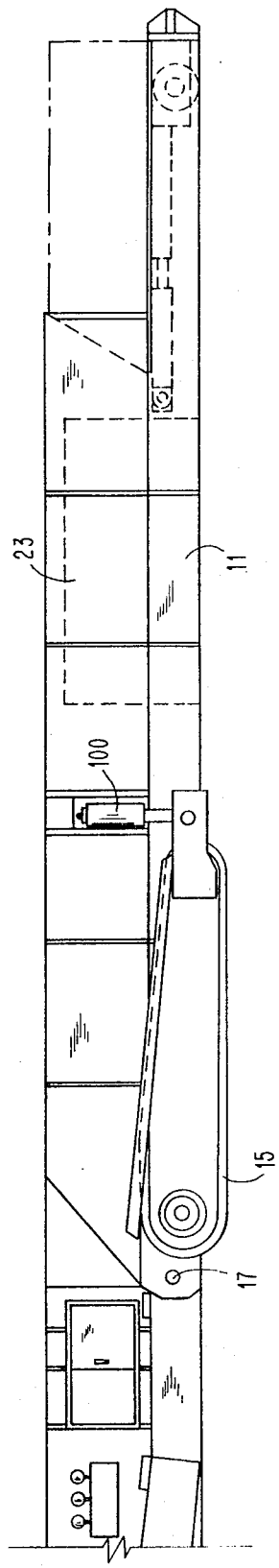
FIG. 2B
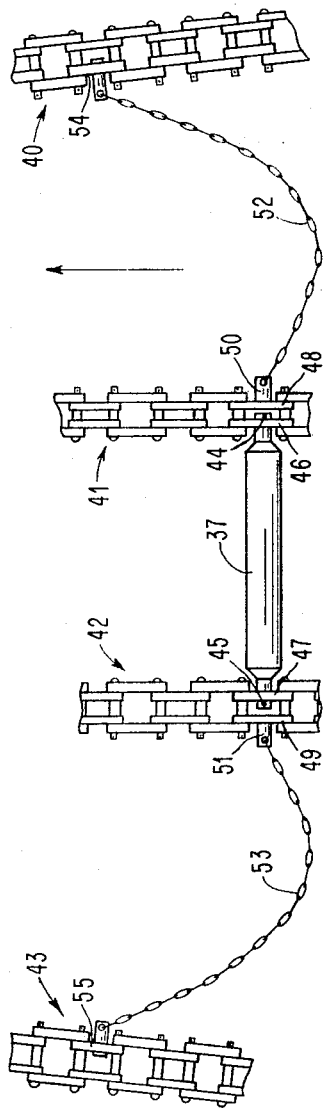
FIG. 9
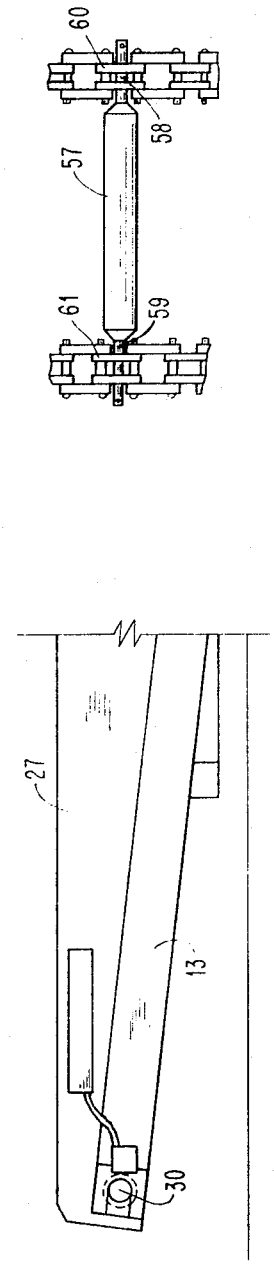
FIG. 10
FIG. 2A
INVENTORS
CHARLES M. ANDERSON
HARRY G. BOLING
BY  W.E. Sherwood
ATTORNEY

DISCRETE MATERIAL HANDLING APPARATUS

BACKGROUND OF THE INVENTION

In the handling of materials such as coal, ore, rock or the like wherein large batch loadings of the discrete form of material are to be conveyed to a discharge station at a substantially constant rate it is customary to employ equipment having a large hopper portion communicating with a smaller discharge chute portion and with a continuous conveyor travelling through the two portions and propelling the material therealong. The conveyor flights not only propel the material but also serve to gather the discrete material for passage into the chute portion. When such flights move in a converging path as disclosed, for example, in Schaeffer U.S. Pat. No. 3,061,210 or Schreyer U.S. Pat. No. 3,063,545 excessive maintenance work often results from wear of the conveyor chains, jamming of the flights by lumps of material adjusting of the chains to maintain synchronization of flight movements, or the like. Moreover, apparatus of this type often is employed in mines wherein limited space is a consideration resulting in the need for a compact form of equipment and limiting the options for the type of conveyor which may be used.

In addition when the conveyor comprises uniform shaped flights only and moving axially of the hopper and chute portions as shown in Anderson U.S. Pat. No. 3,221,865 or Jamison U.S. Pat. No. 3,044,640, supplemental means usually are needed to regulate the flow of material through the choke region at the entrance to the chute portion. The present invention has as its purpose the provision of an improved apparatus whereby disadvantages associated with apparatus of the above-mentioned type may be overcome.

SUMMARY

The material feeder of the invention comprises a hopper portion and a chute portion having a floor across which an endless conveyor moves in sweeping relation to the entire floor surface. The conveyor includes centrally disposed rigid flights joined at the ends to flexible flights which gather the material and agitate it as it moves toward the choke region. The flexible flights collapse as they move through the chute portion after having served their gathering function, and are again extended as they emerge at the intake end of the hopper.

Among the objects of the invention are the provision of a low profile material feeder for intermittently receiving large batch loadings of discrete material and for delivering the same at a substantially constant rate of discharge; the provision of conveyor equipped apparatus which employs a combination of rigid and flexible flights adapted to sweep the entire floor surface; the provision of an improved takeup means for maintaining synchronization of conveyor flights, the provision of means for regulating the travel of collapsible conveyor flights on to and off of the floor of the material feeder, and the provision of a material feeder providing for sufficient agitation of the material in order to avoid blockages at the choke region of the equipment.

These and other objects and advantages of the invention will become more apparent as the description proceeds and when considered in conjunction with the accompanying drawings in which FIG. 1A is a plan view of the discharge section of the apparatus with parts broken away.

FIG. 2A is a side elevation view of the discharge section of the apparatus.

FIG. 2B is a complimentary side elevation view of the intake section of the apparatus.

Figure 6:
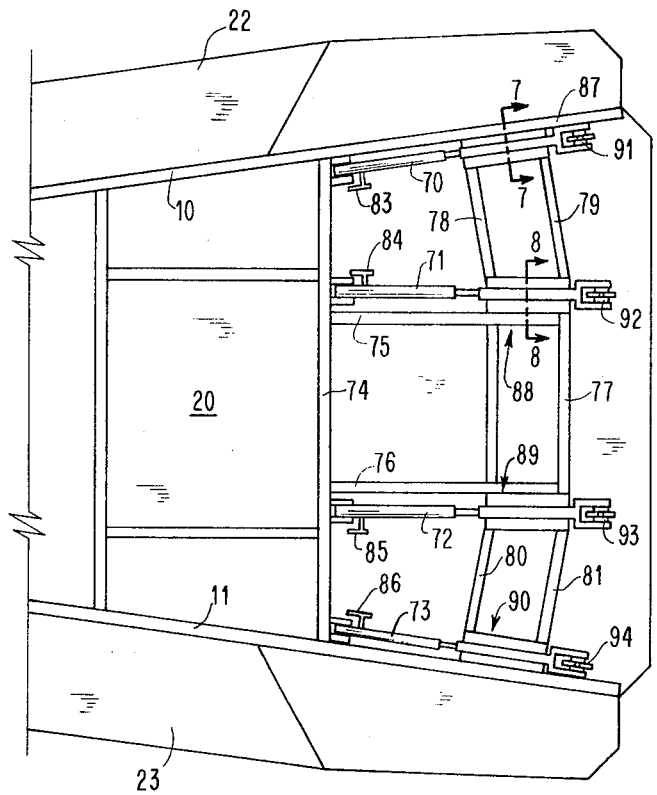
FIG. 6 is a plan view partially broken away and showing the mounting of the sprockets at the intake end of the apparatus.
Figure 7:
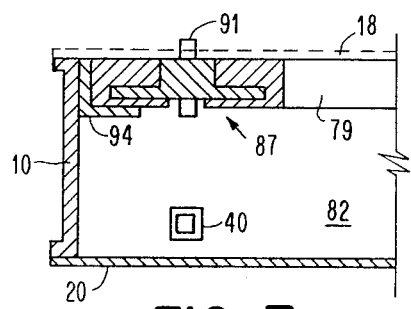
Figure 8:
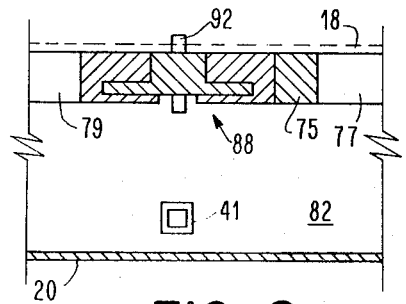

FIGS. 7 and 8 are sectional views to a larger scale and taken respectively on line 7—7 and 8—8 of FIG. 6.

FIG. 9 is a plan view showing one form of mounting of the conveyor flights, and

FIG. 10 is a plan view showing an alternate form of mounting of the conveyor flights.

Figure 1B:
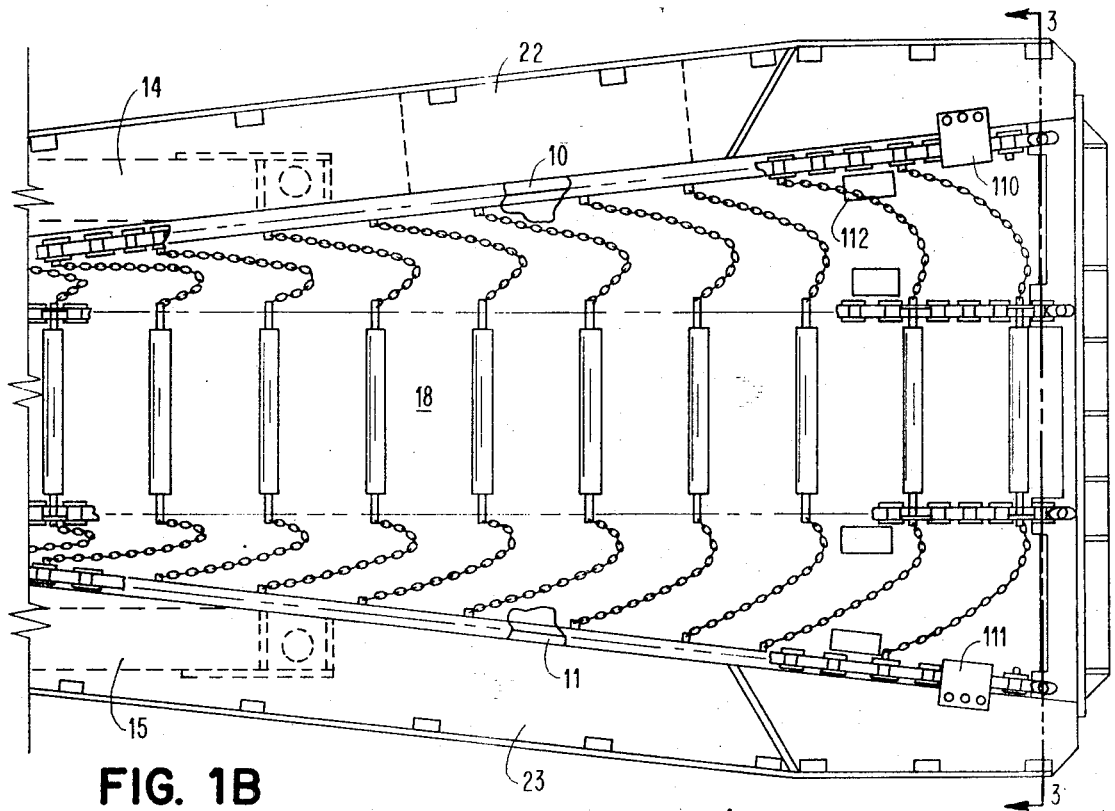
FIG. 1B is a complimentary plan view of the intake section of the apparatus.
Figure 1A:
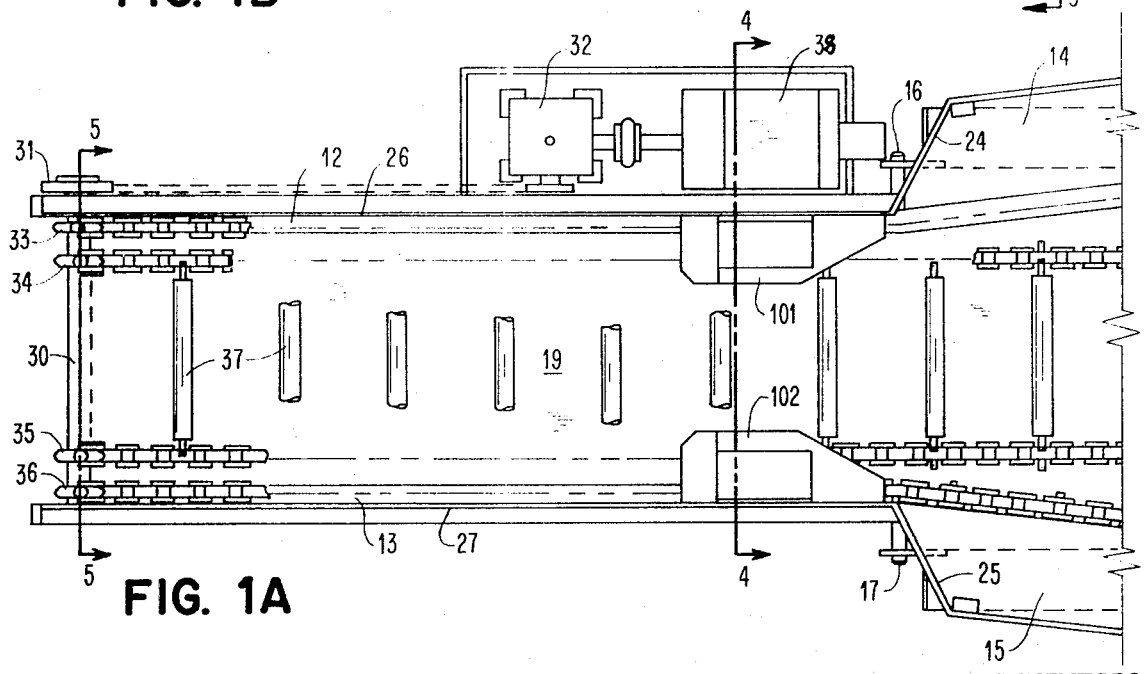

Referring first to FIGS. 1A to 2B the apparatus includes a rigid frame having side beams 10, 11 converging from the intake end of the hopper and attached respectively to parallel side beams 12, 13 leading from the choke region to the discharge end of the machine. The side beams 12, 13 are upwardly inclined toward the discharge end, and the entire frame may conveniently be mounted on a suitable low profile track unit, having crawler tracks 14, 15 and with the frame being pivotable about pins 16, 17 projecting laterally from the frame and engaging with plates carried by the track unit as seen in FIG. 1A.

Figure 3:
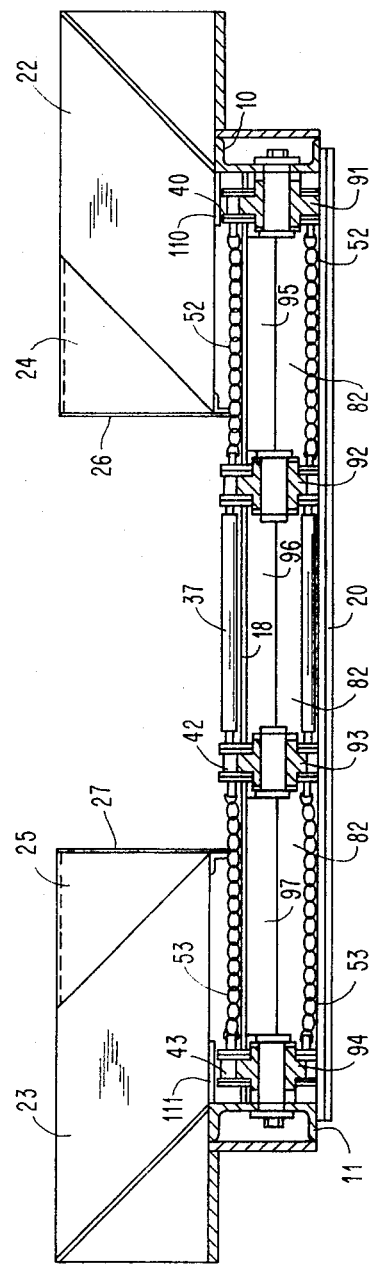
FIG. 3 is a sectional view taken on line 3—3 of FIG. 1B.

Affixed to the side beams is a floor along the upper surface of which the material is moved by an improved conveyor, later to be described, and this floor comprises a hopper portion 18 and a discharge chute portion 19. Likewise affixed to the side beams is a bottom plate spaced from the floor and having a hopper portion 20 and a chute portion 21. Inclined hopper side walls 22, 23 which slope downwardly toward the floor portion 18 and converge toward the choke region of the machine likewise are supported by the side beams 10 and 11, as best seen in FIG. 3. At their distal ends these walls are provided with "throttling board" portions 24, 25 serving to direct material into the chute.

Extending from the inner edges of these throttling boards and supported upon beams 12 and 13 respectively are parallel chute side walls 26, 27 serving to direct material to the discharge end of the apparatus. At their forwardmost ends the side beams 12 and 13 are provided with slots within which a pair of bearings 28, 29 housing a head shaft 30 (FIG. 5) are detachably mounted. A sprocket 31 at one end of this shaft is suitably driven by a chain extending from a speed reducer 32 driven in turn by a motor 38 which in addition drives a conventional pump for the hydraulic system of the apparatus. Attached to and driven by the head shaft are four identical sprockets 33, 34, 35 and 36 and with the sidemost sprockets 33 and 36 being located closely adjacent the respective side beams. The central sprockets 34, 35 are symmetrically mounted on the head shaft relatively far apart in order to accommodate passage of the rigid flights 37 of the improved conveyor of the present invention.

Referring now to FIG. 9 showing a portion of the conveyor moving in the direction of the arrow and taken at an intermediate part of the hopper portion of the apparatus, it will be noted that four identical chains 40, 41, 42 and 43, herein called the first, second, third, and fourth chains, engage with and are driven by the respective sprockets 33 to 36. These chains are of equal length and conveniently may be of the Side-bow Bushed chain type available from Hewitt-Robbins Co., Sandusky, Ohio. A series of rigid solid bar flights 37 which may have any desired cross-sectional configuration dictated by the nature of the discrete material being transported and agitated thereby, and which are dragged along the upper surface of the floor 18–19 have their ends mounted, as by pins 44, 45, within one of the corresponding side connectors 46, 47 of the roller links of the second and third chains. Extending from the corresponding other side connectors 48, 49 of these roller links of the same chains are lateral tangs 50, 51 to which are attached the inner ends of a pair of gathering chains 52, 53 forming a pair of flexible flights. These gathering chains also slide along the floor and have a length such that the entire width of the floor from the inlet to discharge ends will be swept by the combined rigid and flexible flights of the conveyor. At their outer ends these flexible flights are attached to corresponding side connectors 54, 55 of roller links of the first and fourth chains which preferably travel in advance of the links to which the other ends of the flexible flights are attached. This arrangement has been found to aid in tracking of the flexible flights on to and off of the ends of the floor, and also to give a useful camming and agitating action to the discrete material being conveyed through the apparatus.

Other arrangements for mounting of the rigid and flexible flights may be employed without departing from the invention, and as seen in FIG. 10 one alternative may comprise a rigid flight 57 having axially extending pins 58, 59 projecting through both of the connector links of the corresponding roller links 60, 61. In this alternate construction the ends of the flexible flights may be secured to the ends of the pins 58, 59 outboard of the roller links of the second and third chains.

Passing now to FIGS. 6 to 8, the hydraulic system associated with the apparatus includes a series of cylinders 70, 71, 72 and 73 suitably mounted on the underside of the floor portion 18 which is braced by means of a framework including struts 74 to 81 disposed above the bottom plate 20 to leave an unobstructed space 82 for return travel of the conveyor flights. Conduits 83 to 86 furnish pressure fluid to the respective cylinders and the piston rods of these cylinders are attached to slides which move in the cross heads indicated generally at 87 to 90. The stationary portions of the cross heads and the described framework are rigidly affixed as by welding to the lower surface of the floor 18 and during fabrication of the apparatus this normally is done with the floor in inverted position.

At their slides carry yokes within which takeup sprockets 91 to 94 are journaled for rotation in engagement with the respective chains 40 to 43. Thus by regulating the supply of fluid to the cylinders the yokes may be positioned to act as the equivalent of a conventional adjustable tail shaft. As will be noted, the axes of the side sprockets 91 and 94 are disposed generally normal to the plane of the converging side beams 10 and 11 thus displacing the axes of these side sprockets angularly with respect to the axis of the head shaft whereas the axes of the central sprockets 92 and 93 are parallel to the axis of the head shaft 30. The slides of cross heads 87 and 90 also may conveniently be carried by supporting members attached to the inner face of the respective side beams, one such member being seen at 94 in FIG. 7, and the slides of cross heads 88 and 89 may be carried by supporting members attached to the framework.

As best seen in FIG. 3, rounded spacers 95, 96 and 97 attached to the intake end of the floor portion 18 and disposed intermediate adjacent sprockets, aid in guiding the flexible flights 52 and 53 as they are moved from the space 82 beneath the floor 18 and into conveying position above that floor. Likewise, the rigid flights 37 are aided by the spacer 96 in similarly moving into its conveying position above the floor. The described construction provides an entry end of the apparatus which is significantly compact as contrasted with conventional apparatus and floor 18 may, for example, be about nine inches from the ground level and with the intake edge of the bottom plate 20 being at about ground level. To accommodate movement of the apparatus over an uneven ground surface, the hydraulic system includes a hopper elevating cylinder 100 (FIG. 2B) which when actuated serves to tilt the discharge section downwardly and the hopper section upwardly thus to enable the track unit 15 to move the apparatus over an obstruction.

Figure 4:
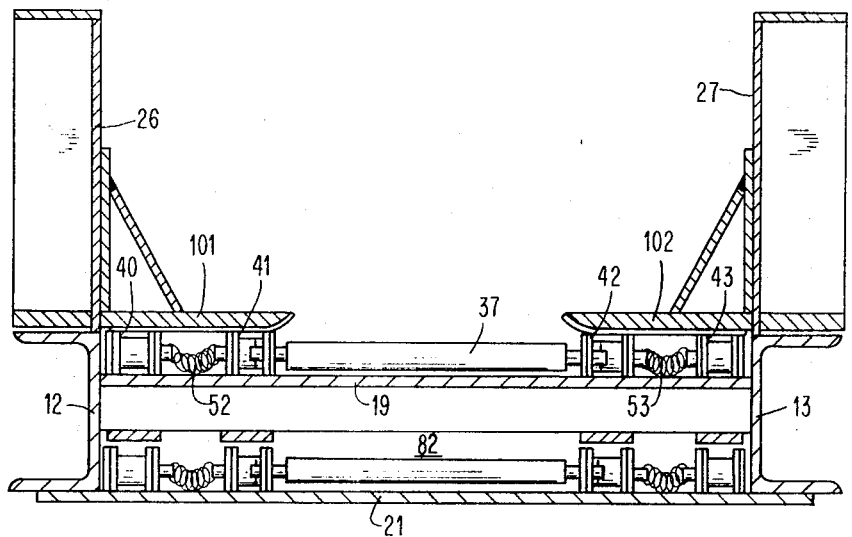
FIG. 4 is a sectional view taken on line 4—4 of FIG. 1A.
Figure 5:
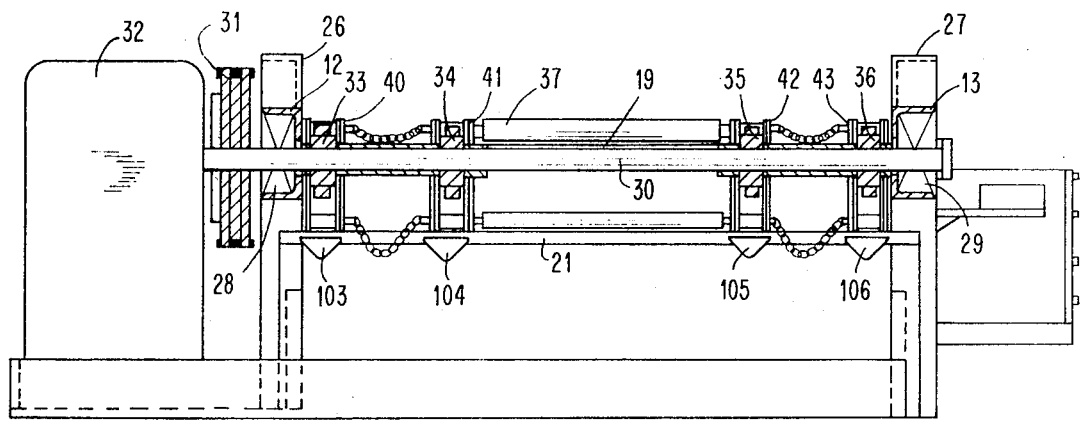
FIG. 5 is a sectional view taken on line 5—5 of FIG. 1A.

As will be apparent, when head shaft 30 is rotated each of the four conveyor chains above floor portions 18, 19 are pulled forwardly and the first and fourth chains travel closely adjacent the side beams 10 and 11 5. as seen in FIGS. 3 and 4. As they approach the entrance to the chute the first and second chains pass under a laterally projecting shoe 101 which prevents lifting of the chains as they are directed toward the elevated discharge end of the chute and at the same time the first chain 40 is bowed so as to move through that chute closely adjacent the side beam 12 as seen in FIG. 5. The third and fourth chains likewise pass under a corresponding shoe 102 and the fourth chain 43 also is bowed to move closely adjacent the side beam 13. During this travel the flexible flights have collapsed from their fully extended condition to a more compact condition in which they can readily pass between the pairs of sprockets 33, 34 and 35, 36 as indicated in FIG. 5. As they tumble from the exit end of the floor 19 they drop between forwardly projecting guides 103 to 106, FIG. 5, and are suspended so as to avoid kinking as they are moved backward over the forward end of bottom plate 21 and into the open space 82 beneath the floor.

Moreover, as they move rearwardly beneath the hopper position the flexible flights are extended and with the attachments to the first and fourth chains travelling in advance of the attachments to the second and third chains. Hold down plates 110, 111 adjacent the entrance end of the hopper aid in establishing proper tracking of the first and fourth chains as they leave the sprockets 91 and 94. Removable access covers one of which is indicated at 112 provide openings in the floor for access to the hydraulic cylinders.

During operation of the above described apparatus intermittent loads of discrete material such as coal are dumped into the hopper section as the conveyor is operating. The moving centrally disposed conveyor portion effects a general movement of that material axially forward the chute and without the presence of the laterally located flexible flights a compacting of such material would be likely to occur at the choke region. However, the movement of the flexible flights is simultaneously causing agitation of the material and due to the described mounting of the flexible flights with their ends adjacent the walls being in advance of their ends adjacent the rigid flights a camming of the material toward the central axis of the machine take place. This camming action in fact continues to occur as the flexible flights in their collapsed condition move through the chute portion of the apparatus. Accordingly, the likelihood of jamming of material at the choke region is substantially reduced and without the necessity of providing vibrating plates or the like for avoiding that contingency. Furthermore, the tracking of the coordinated rigid and flexible flights presents no problem as they approach and pass through the chute portion of the machine due to the collapsible nature of those flexible flights.

Obviously, many modifications and variations of the present invention are possible in the light of the above teachings. It is, therefore, to be understood that within the scope of the appended claims the invention may be practiced otherwise than as specifically described.

What is claimed is:

1. A material feeder for intermittently receiving batch loadings of material into a hopper and delivering the same at a reduced rate of discharge from a chute attached to said hopper and having a width less than that of said hopper, an endless conveyor including second and third chains extending axially of said hopper and said chute and carrying central flights therebetween, first and fourth conveyor chains extending alongside the walls of said hopper and said chute, flexible flights extending respectively between said first and second chains and between said third and said fourth chains, said central flights and flexible flights during their movement being adapted to sweep across substantially all of the floor portions of said hopper and of said chute, and means for driving said conveyor.

2. A feeder as defined in claim 1 wherein the attachments of said flexible flights to the respective first and fourth chains are in advance of the attachments thereof to the respective second and third chains.

3. A feeder as defined in claim 1 wherein said means for driving said conveyor includes a head shaft mounted adjacent the discharge end of said chute and having separate drive sprockets spaced therealong in engagement with the respective first, second, third, and fourth chains.

4. A feeder as defined in claim 3 wherein said sprockets for said second and third chains are spaced sufficiently apart to permit passage of said central flights without reduction of the effective width of the central flights and said sprockets for said first and fourth chains are spaced to require collapsing of said flexible flights.

5. A feeder as defined in claim 3 including separate idler sprockets mounted adjacent the intake end of said hopper in engagement with the respective first, second, third, and fourth chains, the axis of the idler sprockets for said second and third chains being parallel to said head shaft.

6. A feeder as defined in claim 5 wherein the axes of the idler sprockets for said first and fourth chains are angularly displaced from the axis of said head shaft.

7. A feeder as defined in claim 5 including means for adjusting the positioning of said idler sprockets independently of each other thereby to adjust the effective engagement of the idler sprockets with the respective chains carried thereby.

8. A feeder as defined in claim 7 wherein said adjusting means includes a slidable yoke rotatably supporting the idler sprocket, and means for selectively positioning said yoke.

* * * * *